Dec. 21, 1965   H. J. HROCH VON DALEBOR   3,224,433
H ELECTRODES
Filed April 10, 1961   4 Sheets-Sheet 1
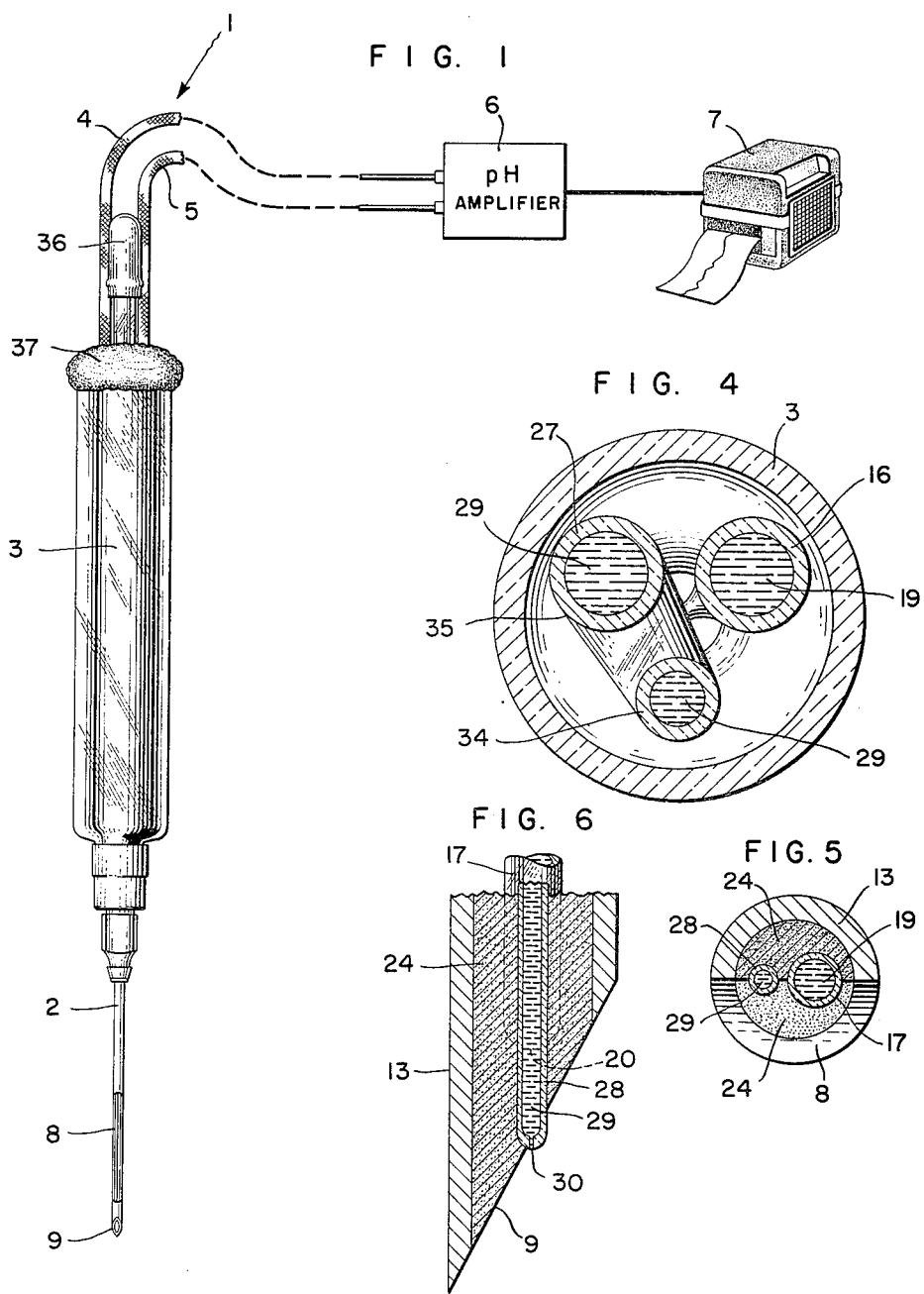
INVENTOR.
Henry J. Hroch Von Dalebor
BY
ATTORNEY.

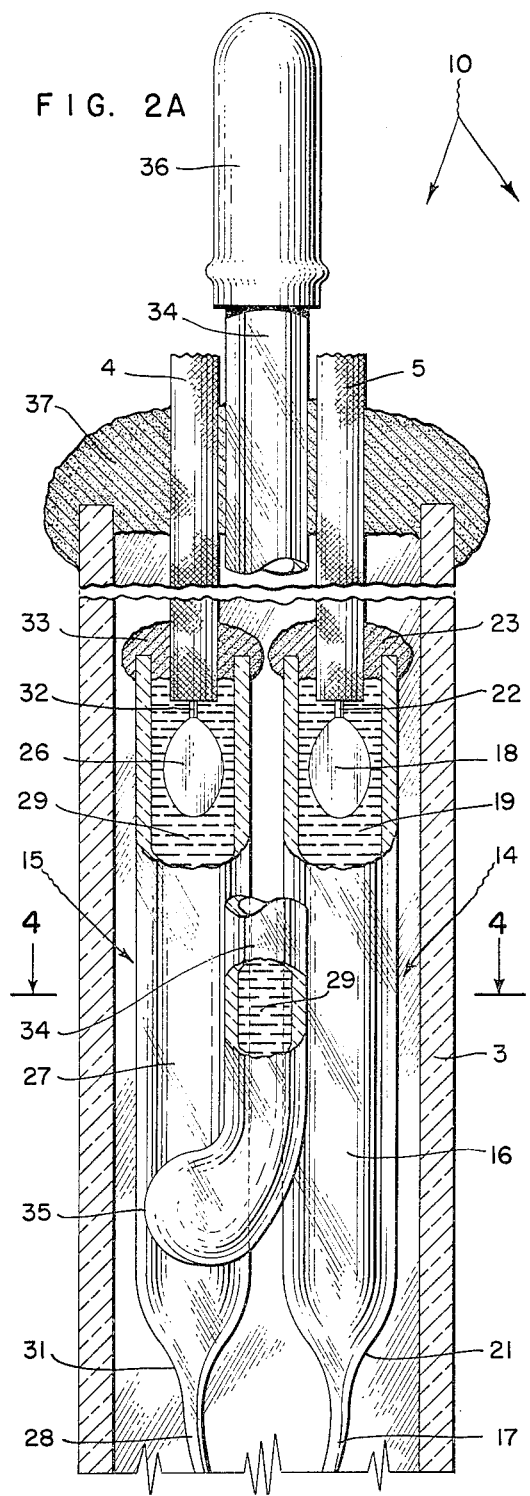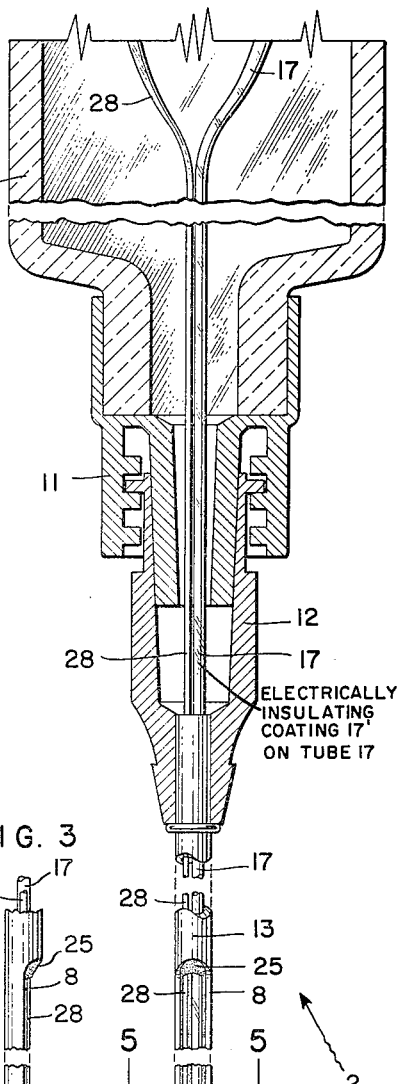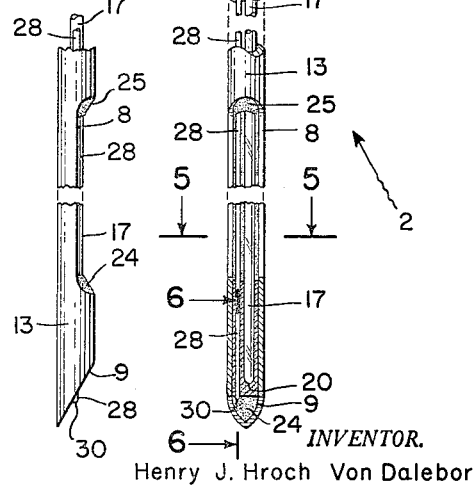

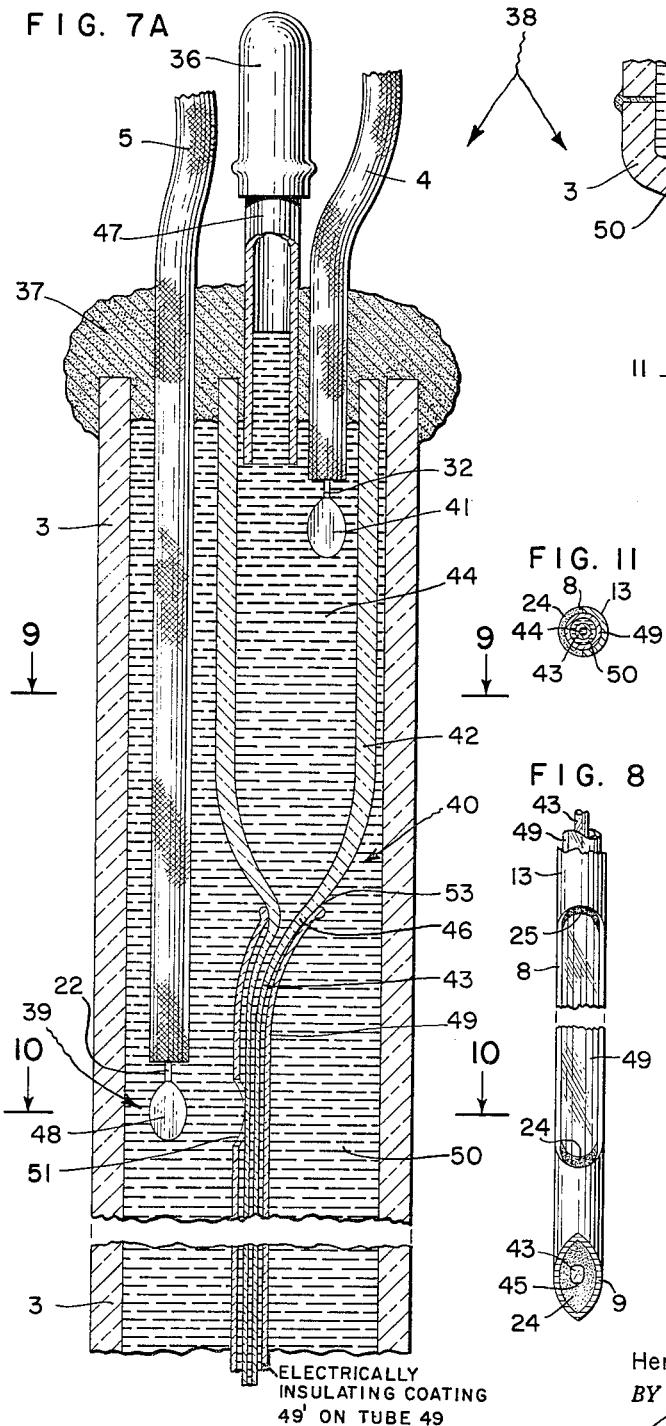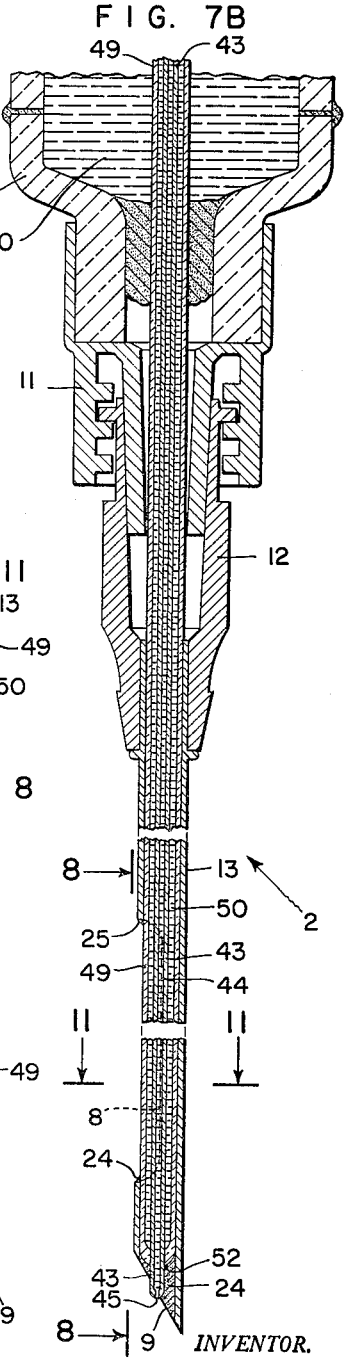

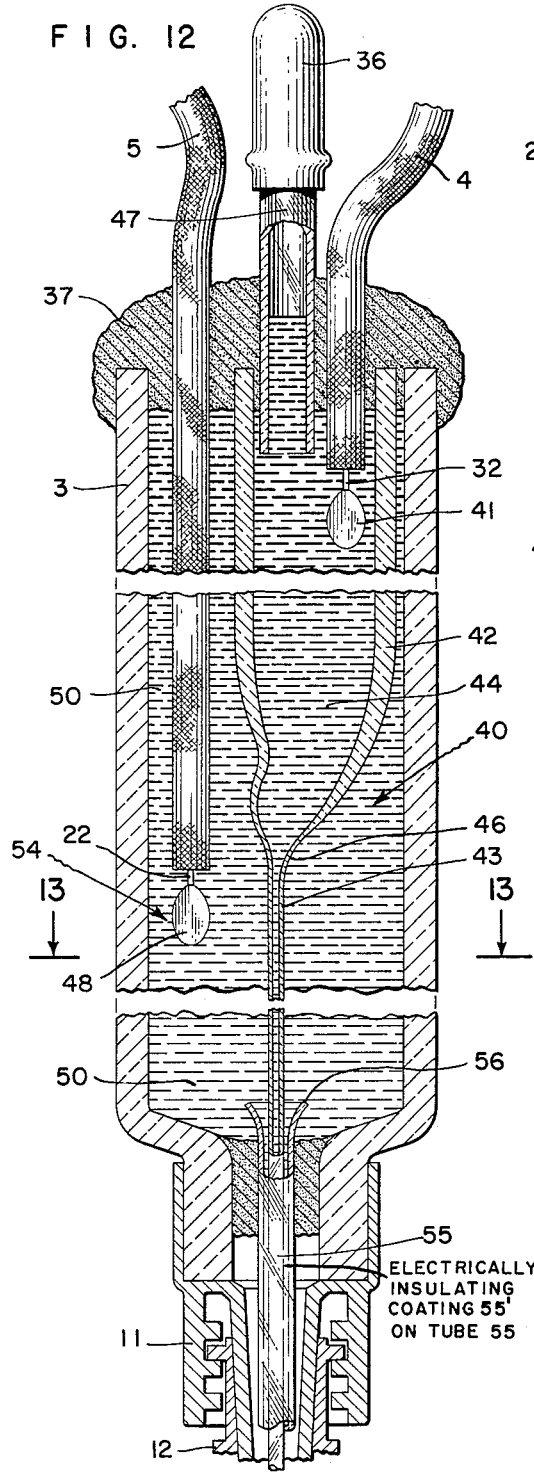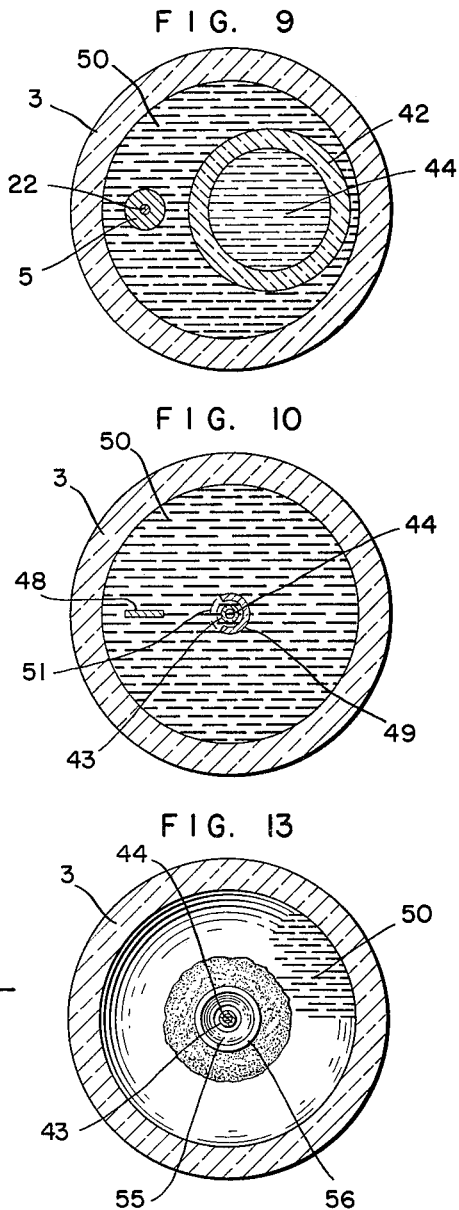

United States Patent Office 3,224,433
Patented Dec. 21, 1965

3,224,433
pH ELECTRODES
Henry J. Hroch von Dalebor, Littleton, Colo., assignor to Honeywell Inc., a corporation of Delaware
Filed Apr. 10, 1961, Ser. No. 101,946
10 Claims. (Cl. 128—2)

The present invention relates generally to apparatus for measuring the value of an electrochemical characteristic of a biological substance. More specifically, the invention relates to electrodes or electrode assemblies for use in the measurement of the value of such a characteristic in situ and in vivo: that is, in the natural location of the biological substance within a living body.

A general object of the present invention is to provide improved apparatus for use in the measurement of the value of an electrochemical characteristic of a biological fluid in vivo and in situ. A specific object of the invention is to provide such improved apparatus comprising novel forms of electrodes or electrode assemblies for use in the measurement of the hydrogen ion concentration, or pH, of blood in situ within a living animal body.

A more specific object of the present invention is to provide novel electrode assemblies of the foregoing type which are arranged to contact the blood in vivo and in situ, and which permit the measurement of the pH of the blood to be effected without requiring the removal of the blood from its natural location or path of flow within the body.

It is well known that there are many situations in medical and surgical practice in which there is a need for the measurement of the value of the pH of blood. Although certain of these situations require merely the routine laboratory sample type of blood pH measurement, there are numerous situations in which accurate pH measurements must be made repeatedly, and often continuously and concurrently with the progress of an operation or other event involving an animal body. Certain of these situations require the continuous accurate measurement of both the magnitude and the frequency of ocurrence of the rapid fluctuations in the pH of the following blood which are present in such situations. The requirements of such situations dictate that the pH measurements be made in vivo, and preferably in situ.

In an attempt to fill these needs, several methods and arrangements have been proposed which are intended to make it possible to obtain the needed blood pH readings. However, all of these previously known techniques of which I am aware have fallen short of providing a practical solution to the problem, since they all are characterized by defects which prevent them from producing the necessary measurements.

A first defect of the known arrangements is that none of them permits the pH measurements to be made under natural or normal conditions, since they all require either that the blood be taken out of its natural place or environment in order that the pH measurements be performed, and hence do not give in situ measurements, or that the necessary electrodes be surgically implanted within the portion of the body, such as an artery, in which the pH of the blood is to be measured, thereby disturbing the normal functioning of the body. This characteristic defect of the known arrangements, of causing the pH measurements to be made under other than normal body conditions, is a practically important fault, since the pH measurements obtained under such abnormal conditions are known to be subject to unpredictable inaccuracies.

Specifically, with the first mentioned or cell type of the known arrangements, the blood to be measured must be placed in a test container or cell, and must thus be removed from the body either permanently or at least temporarily, or must be circulated from the body through the test cell and then returned to the body. All of the forms of this type of the known arrangements obviously cause the pH measurements to be made on blood which is not in its natural environment, and hence to be made under abnormal conditions. Also, with the other of the aforementioned types of the known arrangements, the necessary surgical introduction and presence of the electrodes in the body disturbs the normal functioning thereof and hence causes the pH measurements to be made under abnormal conditions. In each case, inaccurate, and hence unsatisfactory, measurements are the result.

A second defect of the known arrangements lies in the fact that their very natures are such as to preclude their use in many instances. Obviously, it is not possible to use the sampling type of procedure where the continuous measurement of rapid pH changes is required, nor is it possible in many cases to perform the surgery required for the known in situ procedures.

A third common and significant fault shared by the known blood pH measuring methods and devices is their inability to measure the blood pH continuously for any extended period of time. This inability appears to be due to the formation by the blood of a protein film on the pH electrodes. This film increases continually, and finally completely inhibits the pH sensitivity of the electrodes. Since many situations require that the blood pH be accurately measured continuously for extended periods, this shortcoming of the known arrangements is indeed a serious one. The previously suggested use of anticoagulants to be added to the blood stream for the purpose of inhibiting the formation of this desensitizing film has not proved to be of any practical value, since the conditions in many situations prohibit the use of anticoagulants.

All in all, the foregoing several shortcomings of all of the previously known blood pH measuring procedures and arrangements have made them incapable of measuring blood pH accurately under the prevailing conditions, and hence have made it impossible to obtain the need pH measurements in many situations where such measurements would have been of great value. Accordingly, there has been a definite need for improved pH electrode assemblies which can contact the blood directly in its normal location, in a living artery or vein, for example, without disturbing the normal functioning of the body or being adversely affected by the presence of the blood, and which can thus be subjected continually to the changing pH of the blood as it flows over its normal course in its normal environment, to the end of continuously providing the needed accurate measurement of the blood pH and the changes occurring therein.

It is noted in this connection that it has also been proposed in the past to insert delicate, minute electrodes enclosed in glass micropipettes into plant cells, and to insert capillary glass electrodes into animal tissue, in order to measure conditions within these media. Such procedures require the exercise of micro-techniques and extremely careful and accurate manipulation, due to the necessarily small size and fragility of the elements employed, and hence are entirely impractical for other than laboratory use on controlled bodies under ideal conditions. Such procedures are obviously entirely impractical for the measurement under clinical or other practical conditions of a characteristic of blood flowing in a living animal body.

Accordingly, there has been a definite need for improved blood pH electrode assemblies which are designed not only to be able to contact the blood directly and continuously in a living blood stream without producing any mutually adverse effects, but also to have the necessary ruggedness and size so as to be practically usable on living bodies under the normal clinical and other conditions encountered in practice. Moreover, such assemblies, to be practically usable, must additionally be of such form and size as to embody other essential characteristics, such as freedom from injuring or affecting the body when being applied thereto, and the capability of being sterilized. Insofar as I am aware, there are no previously known assemblies which embody these required characteristics or meet the foregoing needs.

Therefore, it is a prime object of the present invention to provide improved blood pH electrode assemblies of novel form which embody all of the foregoing necessary characteristics and features, and which therefore meet and fill the foregoing needs and requirements for such electrode assemblies for use in periodically or continuously measuring accurately the pH of blood in vivo and in situ under practical operating conditions.

To the end of fulfilling the foregoing object, as well as those set forth hereinbefore, portions of the two necessary pH electrodes of each of the novel electrode assemblies according to the present invention are designed and arranged to fit within the bore of a hypodermic needle forming part of the assembly. This needle is provided with apertures through which the blood contacts the portions of the two pH electrodes when the assembly is in use. Thus, by the simple act of inserting this needle into the artery or other place wherein the blood pH is to be measured, the pH electrodes are effectively brought directly into contact with the blood in situ, and the desired pH measurements can be obtained under natural conditions and without disturbing the normal functioning of the body.

In one of the forms of such novel electrode assemblies according to the invention, the two pH electrodes include special glass tubes which lie side by side within the needle. In another form, these electrode tubes lie coaxially within the needle, thus permitting the use of a needle of very small diameter. Further, in each form according to the invention, adverse effects on the electrodes by the blood are prevented by the use of suitable electrode coatings. Thus, each of the novel electrode assemblies according to the invention is one which is sufficiently rugged to permit its practical use under the conditions normally encountered in actual practice, yet is also one which is of such size and construction that the foregoing essential characteristics for permitting continuous, accurate, in vivo and in situ blood pH measurement are embodied therein.

A better understanding of the present invention may be had from the following detailed description of apparatus embodying the invention, which description is to be read in connection with the accompanying drawings, wherein:

FIG. 1 is a general view of a preferred form of blood pH electrode assembly according to the present invention, showing the connection of the assembly to the usual pH ampliflying and displaying means;

FIGS. 2A and 2B are enlarged front views, partly in section, of a specific parallel electrode form which the assembly shown generally in FIG. 1 may take, FIG. 2A being a view of the upper, barrel portion of the assembly, and FIG. 2B being a view of the lower, needle portion thereof;

FIG. 3 is a side view of a portion of the needle shown in FIG. 2B;

FIG. 4 is a cross-sectional view of the barrel of FIG. 2A taken along the line 4—4 of that figure;

FIG. 5 is an enlarged cross-sectional view of the needle of FIG. 2B taken along the line 5—5 of that figure;

FIG. 6 is an enlarged sectional view of the lower portion of the needle shown in FIG. 2B, taken along the line 6—6 of that figure;

FIGS. 7A and 7B are enlarged views, partly in section, of a specific coaxial electrode form which the assembly shown generally in FIG. 1 may take, FIG. 7A being a front view of the upper, barrel portion of the assembly, and FIG. 7B being a side view of the lower, needle portion thereof;

FIG. 8 is a front view of a portion of the needle shown in FIG. 7B;

FIG. 9 is a cross-sectional view of the barrel of FIG. 7A taken along the 9—9 of that figure;

FIG. 10 is a cross-sectional view of the barrel of FIG. 7A taken along the line 10—10 of that figure;

FIG. 11 is a cross-sectional view of the needle of FIG. 7B taken along the line 11—11 of that figure;

FIG. 12 is a front view, partly in section, of an alternate form for the barrel portion of the specific assembly of FIGS. 7 through 11; and FIG. 13 is a cross-sectional view of the barrel of FIG. 12 taken along the line 13—13 of that figure.

The electrode assembly of FIG. 1

In FIG. 1, there is shown a general view of a novel blood pH electrode assembly 1 which embodies the present invention and which thus includes an apertured hypodermic needle 2 in which portions of the pH electrodes are located. As shown, the assembly 1 also includes a barrel portion 3 which supports and carries the needle 2. For convenience of construction and operation, this barrel portion 3 may well be, and is shown herein as being, the usual syringe barrel which would usually be combined with a hypodermic needle to form the usual hypodermic syringe. However, in the practice of the present invention, in accordance with an important and novel feature thereof, the barrel and needle combination is not used as a syringe at all. Instead, the barrel 3 serves to house other portions of the pH electrodes and to support and carry the needle 2, while the latter, which is modified in accordance with the invention, serves as a means for placing the first-mentioned portions of the pH electrodes directly in a living body to permit in situ pH measurements to be made. The needle 2 also serves, of course, to support and protect the pH electrodes.

The FIG. 1 electrode assembly also includes output leads or conductors 4 and 5, which are shown in FIG. 1 as being coaxial cables connected to the usual pH amplifier 6. The latter, in turn, is shown as being connected to a suitable recording instrument 7. This instrument may well be, and is shown in FIG. 1 as being, an oscillographic recorder of the direct writing type as made and sold by the Heiland Division of the Minneapolis-Honeywell Regulator Co. Since the details of such a recorder are shown and described in the Heiland Patent No. 2,580,427, for example, and form no part of the present invention, they are not repeated herein.

Further, in accordance with the invention, the needle 2 is provided with an elongated aperture or window 8 and an end opening 9 through which the blood or other fluid contacts the pH electrodes within the needle when the latter has been inserted into an artery or other place within a body. As will be explained in more detail hereinafter, this action results in the production between the conductors 4 and 5 of an electrical signal of a value dependent upon that of the pH of the fluid to which the electrodes within the needle 2 are exposed. In the usual manner, this electrical value is amplified by the device 6, and is recorded as a pH value by the recorder 7.

The electrode assembly of FIGS. 2–6

The details of a preferred, parallel electrode form which the assembly 1 may take are shown in FIGS. 2 through 6. FIGS. 2A and 2B, taken together, show the complete electrode assembly of this form, which assembly is designated herein by means of the reference character 10. This assembly includes the barrel portion 3, which terminates in the usual needle-supporting sleeve 11, and the needle 2, consisting of the usual hub and flange portion 12 and usual shank portion 13. The latter is provided with the aperture or window 8 and the end opening 9. The barrel sleeve 11 and the needle hub and flange portion 12 cooperate to secure the needle 2 to the barrel 3 in the usual manner.

As is necessary for the measurement of pH, the assembly 10 includes two pH electrodes which constitute a so-called electrode pair. One electrode of this pair is a so-called glass electrode, and is designated by the reference character 14. The other electrode is a so-called reference electrode, and is designated by the reference character 15. Each of these electrodes is of a novel form in accordance with the present invention, and consists of a number of portions as will now be explained.

*The glass electrode 14*

The novel glass electrode 14 consists of an upper glass tube 16 located within the barrel 3, a lower tube 17 of pH sensitive glass extending down into the bore of the needle 2, an internal reference electrode member 18, an electrically conductive liquid fill or electrolyte 19, and various seals and coatings to be described hereinafter. The lower end of the tube 17 is sealed off at a point 20 within and adjacent the lower end or tip of the needle shank 13, as best seen in FIGS. 2B and 6. From there, the tube 17 extends upwardly to a point 21 within the barrel 3, at which point the tube 17 joins and is sealed to the upper tube 16.

The internal reference electrode member 18 is electrically connected to the central conductor 22 of the coaxial lead 5, which in turn is sealed into the upper end of the tube 16 by a suitable sealing material 23. This places the electrode 18 within the upper portion of the tube 16. The liquid 19 completely fills the tubes 16 and 17, and, being an electrical conductor, thus forms an electrical connection between the electrode 18 and the interior of the wall of the tube 17. The significance of this will become apparent as the following description of the glass electrode 14 progresses.

The pH sensitive glass tube 17 is provided with a suitable electrically insulating coating 17' which extends over the entire outer surface of the tube 17 except for the portion of this surface which lies within the window 8. Accordingly, this uncoated, uninsulated area of the tube 17 is the active sensing portion of the tube 17 and hence of the entire glass electrode 14. Thus, when the needle 2 is surrounded by a fluid, as occurs when the assembly is in use, the uncoated, sensing surface of the tube 17 is in contact with the fluid by virtue of the window 8, whereby a portion of the pH measuring circuit or electrode chain is established. This portion can be traced from the surrounding fluid through the exposed wall of the tube 17 to the liquid fill 19, and through the latter to the internal reference electrode member 18. In this electrode chain, the exposed wall of the tube 17 forms a pH sensitive glass membrane, in the known manner for glass pH electrodes.

The aforementioned insulating coating on the non-sensing portion of the tube 17 is necessary in order to prevent creeping currents, which would tend to cause unsteady and erroneous pH measurements, and in order to increase the electrical resistance ratio between the sensing and non-sensing portions of the tube 17 to the high value needed for consistent and accurate pH measurements. Additionally, in order to insure the presence of a high degree of electrical insulation between the tube 17 and the needle 2, the interior of the latter is also coated with the same material employed as the coating on the tube 17.

Further, the space between the tube 17 and the interior wall of the needle bore, except for the space occupied by the reference electrode 15 to be described hereinafter, is filled and sealed with this same electrically insulating coating matrial. Therefore, the tube 17 is supported within the needle bore by this fill of the coating material. The portion of this fill below the window 8 has been identified in the drawings by the reference character 24, and fills the needle bore around the tube 17 from the end opening 9 up to the lower margin of the window 8, as best seen in FIGS. 2B, 5 and 6. Similarly, an upper portion 25 of this insulating fill extends upwardly from the upper margin of the window 8 and supports the tube 17 within the needle bore above the window 8. In addition to supporting the tube 17 within the needle bore, the insulating fill also serves to seal off the bore of the needle from liquids which would otherwise enter at the window 8 and end opening 9 when the assembly is in use. Additionally, this fill prevents any of the surrounding fluid from penetrating between the back wall of the needle adjacent the window 8 and the tube 17, where any such fluid would tend to influence the measured pH and thus would tend to cause inertia in the response to changing pH of the exposed, sensing surface of the tube 17.

*The reference electrode 15*

The novel reference electrode 15 is actually a combination of a so-called external reference electrode member 26 and a so-called salt bridge which extends between the electrode member 26 and the fluid whose pH is to be measured. This salt bridge portion of the reference electrode 15 includes an upper glass bridge tube 27 located within the barrel 3, a lower glass bridge tube 28 extending down into the bore of the needle 2 and supported in the needle bore by the insulating fill, a suitable salt bridge liquid fill 29, and a coating and seals to be described hereinafter. The lower portion of the tube 28 terminates just outside the lower margin of the insulating and supporting fill 24 at the needle end opening 9, and is provided at this point with a very small end or tip opening 30, as best seen in FIGS. 2B and 6.

From the tip opening 30, the tube 28 extends upwardly through the needle 2 and the insulating fill to a point 31 within the barrel 3, at which point the tube 28 joins and is sealed to the upper tube 27. The external reference electrode member 26 is electrically connected to the central conductor 2 of the coaxial lead 4, which in turn is sealed into the upper end of the tube 27 by a suitable sealing material 33. This places the electrode 26 within the upper portion of the tube 27.

The liquid 29 completely fills the tubes 27 and 28, and forms a liquid junction with the fluid surrounding the needle through the tip opening 30. Therefore, the liquid 29 of the salt bridge actually bridges between the electrode 26 and the surrounding fluid whose pH is to be measured. The pH electrode chain established by the reference electrode 15 can thus be traced from the surrounding fluid to the liquid fill 29 through the tip opening 30, and through the liquid 29 to the external reference electrode member 26. In this electrode chain, the liquid 29 serves the usual purpose which salt bridge solutions serve in the making of pH measurements.

In order to assure that the liquid 29 will always completely fill the salt bridge from the electrode 26 down to the fluid surrounding the tip opening 30, the upper tube 27 of the reference electrode 15 is provided with a branch portion 34 which joins the tube 27 at a point 35, as best seen in FIGS. 2A and 4. This branch tube 34 is also filled with the liquid 29 and thus acts as a reservoir for a reserve supply of this liquid. The tube 34 also serves as the means by which the electrode 15 is initially filled with the liquid 29. A suitable pinch bulb 36 closes the upper end of the tube 34 and provides a means whereby the tubes 27 and 28 can be kept completely filled.

As seen best from FIGS. 1 and 2A, the tube 34 and the leads 4 and 5 are sealed into the top of the barrel 3 by a suitable sealing material 7. This construction causes the tubes 16, 27, and 34, and hence the upper portions of the electrodes 14 and 15, to be properly supported within the barrel 3. The lower portions of the electrodes 14 and 15—that is, the tubes 17 and 28—are supported within the bore of the needle 2 by the insulating fill, such as that shown at 24 and 25. Therefore, the electrodes 14 and 15 are completely supported within the assembly 10.

pH electrode anticoagulation coating

In order to permit the foregoing electrode assembly to be used to make in vivo and in situ blood pH measurements continuously over extended periods of time without requiring the undesirable procedure of introducing an anticoagulant into the blood stream, the exposed portions of the pH electrode tubes 17 and 28 are, according to the present invention, coated with a substance which prevents the formation on said exposed portions of the aforementioned protein film. As noted previously herein, such a film builds up on such exposed electrode portions and renders them inoperative unless a coating of the type described herein is present on the exposed electrode surfaces. In the case of the tube 17, this film would completely destroy the pH sensitivity of this tube, while in the case of the tube 28, the film would block the opening 30 and hence interrupt the salt bridge.

In order that the above coating will serve its stated purpose and at the same time will be practically usable, the material used as the coating must have several characteristics. In the first place, this material must, of course, prevent, or at least inhibit for long periods, the formation of the aforementioned protein film. Secondly, it must not inhibit or in any way change undesirably the pH sensitivity of the electrodes. Additionally, it must not be toxic when in contact with blood. Finally, its application to the electrode surfaces must be readily and practically accomplishable, and must not involve the use of temperatures which would be harmful to the electrodes.

I have discovered that there are several materials which embody the several foregoing essential characteristics and hence are suitable for use as pH electrode coatings according to the present invention. One of these is a chlorosilane known as Silgon Glass Glaze. Another is a water soluble silicone concentrate known as Siliclad. Still another is a resin known as Kel-F800. The Silgon Glass Glaze has been found to be the most suitable material for use as the pH electrode coating since a coating of this material has been found to enhance materially the pH response of the glass electrode 14, while at the same time meeting all of the foregoing essential requirements for such a coating.

As mentioned above, the described coating is applied to the exposed portions of the pH electrode tubes 17 and 28. Specifically, this coating is applied to the sensing surface of the tube 17 which is exposed through the needle window 8, and to the exposed part of the tube 28 which projects from the fill 24 in the opening 9 at the end of the needle. The presence of this coating has made it possible, for the first time insofar as I am aware, to make continual blood pH measurements in vivo without the introduction of any anticoagulants into the blood stream.

Operation of the assembly 10

In use, the needle 2 is inserted into the artery or other body portion wherein the pH of the blood or other body fluid is to be measured. Thereupon, the fluid contacts, through the window 8, the exposed portion of the surface of the pH sensitive glass tube portion 17 of the glass electrode 14. At the same time, the fluid contacts the salt bridge liquid portion 29 of the reference electrode 15 through the tip opening 30 in the tube portion 28 of that electrode, which portion extends from the opening 9 in the needle 2. Therefore, when the needle 2 is in use, the blood or other body fluid directly contacts in situ the portions of the two electrodes 14 and 15 which are in the bore of the needle 2, this contacting taking place through the window 8 and the end opening 9 provided in the needle 2. Under these conditions, the glass electrode 14 and the reference electrode 15, and hence the internal reference electrode member 18 and the external reference electrode member 26, cooperate in the usual manner for a pH electrode pair to produce between the conductors 22 and 32 of the respective leads 5 and 4 an electrical signal of a value dependent upon that of the pH of the surrounding fluid. The value of this signal is then recorded and displayed by the instrument 7 as the desired pH value of said fluid.

It should be readily apparent that the electrode assembly 10 just described is a novel one which, according to the present invention, is practical to manufacture and to use, which is sufficiently rugged for its intended purpose, and which keeps the number and size of required body punctures to a minimum. It should be clear also, therefore, that this assembly embodies all of the necessary characteristics and features set forth hereinbefore, and hence meets and fulfills the several needs and objects enumerated above.

Typical characteristics

By way of illustration and example, and not by way of limitation, the following table lists a set of related typical characteristics, such as materials and dimensions, which the various portions of an actual assembly of the type of the assembly 10 may have in practice.

| Ref. No. | Item | Typical material, type, etc. | Typical size, etc. |
| --- | --- | --- | --- |
| 2 | Needle | Hypodermic | 16 gauge. |
| 3 | Barrel | do | 10 ml. |
| 8 | Window | | Length, 20 mm.; depth, radius of needle. |
| 16 | Upper tube | Pyrex glass | O.D., 5 mm. |
| 17 | pH sensitive tube | Corning 015 glass | O.D., 0.6 mm. av. |
| 18 | Internal ref. electrode | Ag-AgCl | Diam., 3–4 mm. |
| 19 | Liquid fill | HCl | 0.1 N. |
| 23, 33, 37 | Sealing material | Silicone rubber, e.g., Dow Corning "Silastic." | |
| 24, 25 | Insulating fill (also coating on tube 17). | | |
| 26 | External ref. electrode | Ag-AgCl | Diam., 3–4 mm. |
| 27 | Upper salt bridge tube | Pyrex glass | O.D., 5 mm. |
| 28 | Lower salt bridge tube | do | O.D., 0.1 mm. |
| 29 | Liquid fill | KCl | Saturated. |
| 30 | Tip opening | | Diam., 2–3 microns. |
| None | Anticoag. coating | Silgon glass glaze | |

The electrode assembly of FIGS. 7–11

In the parallel form of electrode assembly 10 just described, the tube portions 17 and 28 of the respective electrodes 14 and 15 lies side by side within the bore of the needle 2. In FIGS. 7 through 11, there is illustrated an alternate form of electrode assembly 38 according to the present invention. In this form, the tube portions of the two pH electrodes of the assembly lie coaxially within the associated needle, thereby permitting the use of a needle of very small diameter. FIGS. 7A and 7B, taken together, show the complete coaxial electrode assembly 38. In FIGS. 7 through 11, portions which are the same as those in FIGS. 2 through 6 bear the same reference characters as their FIGS. 2 through 6 counterparts.

The assembly 38 includes the barrel portion 3, the needle 2, the coaxial leads 4 and 5, the needle window 8 and end opening 9, insulation fills 24 and 25 within the needle bore, the fill tube bulb 36, and the top seal 37, all substantially as in the assembly 10. The assembly 38 also includes a pH electrode pair consisting of a glass electrode 39 which surrounds a reference electrode 40. Each of these electrodes is of a novel form in accordance with the present invention, and consists of a number of portions as will now be explained.

*The reference electrode 40*

Since the reference electrode 40 lies within the glass electrode 39, the electrode 40 will be described first. This electrode is actually a combination of an external reference electrode member 41 and a salt bridge, as was the case for the previous reference electrode 15. In the assembly 38, however, the salt bridge portion of the reference electrode 40 includes an upper glass bridge tube 42 located within the barrel 3, a lower glass bridge tube 43 extending down into and through the bore of the needle 2, and a suitable salt bridge liquid fill 44. As best seen in FIGS. 7B and 8, the lower portion of the tube 43 terminates just outside the lower margin of the fill 24 at the needle end opening 9, and is provided at this point with a very small tip opening 45 as for the assembly 10.

From the tip opening 45, the tube 43 extends upwardly through the needle 2 and the insulating fill to a point 46 within the barrel 3, at which point the tube 43 joins and is sealed to the upper tube 42. The external reference electrode 41 is electrically connected to the central conductor 32 of the coaxial lead 4, which in turn is sealed into the upper end of the barrel 3 by the sealing material 37, as in the upper end of the tube 42. This places the electrode 41 within the upper portion of the tube 42.

The liquid 44 completely fills the tubes 42 and 43, and forms a liquid junction with the fluid surrounding the needle through the tip opening 45. Therefore, the liquid 44 of the salt bridge actually bridges between the electrode 41 and the surrounding fluid whose pH is to be measured. The pH electrode chain established by the reference electrode 40 can thus be traced from the surrounding fluid to the liquid fill 44 through the tip opening 45, and through the liquid 44 to the external reference electrode member 41. In this electrode chain, the liquid 44 serves the usual salt bridge purpose as does the liquid 29 in the assemly 10.

The electrode 40 is also supplied with a fill tube 47 which extends down into the tube 42 through the sealing material 37, and which is capped by the pinch bulb 36. As for the branch fill tube 34 of the assembly 10, the tube 47 serves both as a means for initially filling the tubes 42 and 43 with the liquid 44, and as a means for keeping these tubes so filled in service.

*The glass electrode 39*

The novel glass electrode 39 includes an internal reference electrode member 48, located within the barrel 3, a pH sensitive glass tube 49 extending down into the needle 2 and surounding the reference electrode tube 43, and a liquid fill 50 which fills the barrel 3 and the tube 49, wherein it surrounds the tube 43. FIGS. 7A, 7B, 8, and 11 clearly show the coaxial relationship between the tubes 43 and 49.

The interior of the tube 49 is in communication with the interior of the barrel 3 through an opening 51 in the wall of the tube 49 within the barrel 3. Thus, as can be seen particularly from FIGS. 7A and 10, the liquid 50 forms a conductive path from the internal reference electrode 48 to the interior of the wall of the tube 49 via the opening 51.

The lower end opening of the tube 49 is sealed off against the outer wall of the tube 43 with a glass-to-glass seal at a point 52 within the fill 24 at the lower end of the needle 2, at which point the tube 43 passes out of the tube 49. From there, the tube 49 extends upwardly through the needle bore and through sealing material in the lower part of the barrel 3 to a point 53 within the barrel, at which point the upper end opening of the tube 49 is sealed off against the outer wall of the tube 42. This glass-to-glass seal at point 53 occurs somewhat above the point 46 at which the lower tube 43 joins the upper tube 42 of the reference electrode 40. The foregoing construction causes the tube portions of the electrodes 39 and 40 to be suitably supported within the assembly 38.

The internal reference electrode 48 is electrically connected to the central conductor 22 of the coaxial lead 5, which in turn is sealed into the upper end of the barrel 3 by the sealing material 37. FIGS. 7A and 9 show this location of the lead 5. The latter desirably supports the electrode 48 adjacent the opening 51 in the tube 49.

As for the assembly 10, the inner surface of the needle bore and the outer surface of the pH sensitive tube 49, except for the portion of this tube surface lying within the needle window 8, are provided with a suitable electrically insulating coating, the coating on the tube 49 bearing the reference numeral 49'. This uncoated portion of the tube 49 in the window 8 is thus the active pH sensing portion or membrane of the glass electrode 39. Thus, when the assembly 38 is in use, an electrode chain is formed which extends from the surrounding fluid through the exposed wall of the tube 49 to the liquid fill 50, and through the latter and the opening 51 to the internal reference electrode member 48. Also as for the assembly 10, the exposed portion of the tube 49 in the window 8, and the exposed portion of the tube 43 at the needle end opening 9, are coated to prevent protein film formation as explained hereinbefore.

*Typical characteristics*

By way of illustration and example, and not by way of limitation, the following table lists a set of related typical characteristics, such as materials and dimensions, which the various portions of an actual assembly of the form of the assembly 38 may have in practice.

| Ref. No. | Item | Typical material, type, etc. | Typical size, etc. |
| --- | --- | --- | --- |
| 2 | Needle | Hypodermic | 19 gauge. |
| 3 | Barrel | do | 5 ml. |
| 8 | Window | | Length: 20 mm. Depth: radius of needle. |
| 24, 25 | Insulating fill (also coating on tube 49). | Silicone rubber, e.g., Dow Corning "Silastic." | |
| 37 | Sealing material | Epoxy cement | |
| 41 | External ref. electrode | Ag-AgCl | Diam., 3-4 mm. |
| 42 | Upper salt bridge tube | Soda-lime glass | O.D., 5 mm. |
| 43 | Lower salt bridge tube | do | O.D., 0.1 mm. |
| 44 | Liquid fill | KCl | Saturated. |
| 45 | Tip opening | | Diam., 2-3 microns. |
| 48 | Internal ref. electrode | Ag-AgCl | Diam., 3-4 mm. |
| 49 | pH sensitive tube | Corning 015 glass | O.D., 0.6 mm. av. |
| 50 | Liquid fill | HCl | 0.1 N. |
| None | Anticoag. coating | Silgon glass glaze | |

It should be readily apparent that the electrode assembly 38 just described is a novel one which operates in the same basic manner as does the assembly 10, and is one which, like the assembly 10, embodies the several necessary characteristics and meets and fulfills the several needs and objects enumerated hereinbefore. Additionally, it should be apparent that the coaxial relationship of the electrode tubes 43 and 49 within the bore of the needle 2 makes it possible to effect a substantial and advantageous reduction in the size of the needle required to house the two electrode tubes.

The modification of FIGS. 12 and 13

In FIGS. 12 and 13 there is shown an alternate form which the upper or barrel portion of the assembly 38 may take in practice. This alternate form differs from that of the assembly 38 in the form of the glass electrode and in the manner in which the pH sensitive tube thereof terminates in the barrel and communicates with the liquid therein. Specifically, the novel glass electrode 54 of FIG. 12 includes, in addition to the internal reference electrode member 48 and the liquid fill 50, a pH sensitive glass tube 55 which extends down into the needle 2 and which, outside of the barrel 3, does not differ from the tube 49 of the assembly 38. The upper end 56 of the tube 55, however, is flared, and opens directly into the barrel 3 around the tube 43, instead of being sealed to the tube 42 as in the assembly 38. This different construction results in an assembly which is somewhat more readily fabricated than the assembly 38. In FIG. 13, the liquid fill 50 is only partially shown, in order to effect a clearer showing of the construction at the lower end of the barrel 3.

Other forms of pH electrodes and assemblies coming within the scope of the present invention are disclosed and claimed in the copending application of Robert A. Le Massena, Serial No. 101,797, filed on even date herewith and assigned to the assignee of the present invention.

Summary

It is readily apparent in the light of the foregoing description that the present invention provides a novel electrode assembly which consists of novel pH electrodes located within a hypodermic needle and so coated as to provide continuous measurements of blood pH in vivo and in situ over extended periods of time without requiring the introduction of anticoagulants into the blood stream. Moreover, it is also readily apparent that this novel assembly, in each of its forms, embodies the following characteristics which are essential for the successful and practical making of such measurements:

(1) The assembly is convenient to use and to maintain.
(2) The assembly is sufficiently rugged to permit its successful use under practical working conditions.
(3) The use of the assembly involves a minimum of discomfort and injury to the body, and a minimum of interference with the normal functioning of the body.
(4) In use, the pH electrodes contact the blood in situ.
(5) The electrodes exposed to the blood are not adversely affected thereby over extended periods.
(6) The assembly is practical to make.

What is claimed is:

1. A pH electrode assembly comprising a hypodermic needle having an axial bore and a pointed end, a glass pH electrode having a tube portion located within said bore and terminating therein adjacent said needle end, and an elongated window in the wall of said needle extending from adjacent said end parallel to the axis of said needle, and passing from the exterior of said needle to said bore, a section of said tube portion which is in register with said window being arranged to constitute a pH-sensitive membrane.

2. A pH electrode assembly comprising a hypodermic needle having an axial bore, an open, pointed end, and an opposite end, means supporting said needle at its said opposite end and having a chamber which communicates with said bore, a glass pH electrode having a tube portion extending from within said chamber through said needle bore and terminating therein adjacent said open needle end, an elongated window through the wall of said needle extending from adjacent said open needle end parallel to the axis of said needle, a section of said tube portion which is in register with said window being arranged to constitute a pH sensitive membrane, a reference electrode having a tube portion extending from within said chamber through said bore, terminating at said open needle end, and having a relatively small end opening in register with said open needle end, a separate electrode member individual to each of said electrodes, located within said chamber, and provided with an electrical lead connection, an electrically conductive substance in said tube portion of said glass electrode bridging between the corresponding one of said electrode members and said pH sensitive membrane section, and an electrically conductive substance in said tube portion of said reference electrode bridging between the corresponding one of said electrode members and said end opening of the last mentioned tube portion.

3. An assembly as specified in claim 2, wherein said two tube portions lie side-by-side within said needle bore beneath said window.

4. An assembly as specified in claim 2, wherein said two tube portions lie coaxially within said needle bore, with the first mentioned one of said tube portions surrounding the other.

5. A pH electrode assembly comprising a hypodermic needle having an axial bore, an open, pointed end, and an opposite end, means supporting said needle at its said opposite end and having a chamber which communicates with said bore, a glass pH electrode having a tube portion of pH-sensitive glass extending from within said chamber through said needle bore and terminating therein adjacent said open needle end, an elongated window through the wall of said needle extending from adjacent said open needle end parallel to the axis of said needle and exposing a section of said tube portion which is in register with said window, an electrically insulating coating on the exterior surface of said tube portion except for said exposed section thereof, whereby said section constitutes a pH-sensitive membrane, a reference electrode having a tube portion extending from within said chamber through said needle bore, terminating at its said open needle end, and having a relatively small end opening in register with said open needle end, a separate electrode member individual to each of said electrodes, located within said chamber, and provided with an electrical lead connection, an electrically conductive substance in said tube portion of said glass electrode bridging between the corresponding one of said electrode members and said pH-sensitive membrane section, and an electrically conductive substance in said tube portion of said reference electrode bridging between the corresponding one of said electrode members and said end opening of the last mentioned tube portion.

6. An assembly as specified in claim 5, including a coating of a chlorosilane on the surface of at least said pH-sensitive membrane section of the first mentioned tube portions.

7. A pH electrode assembly comprising a hypodermic needle having an axial bore, a wall aperture, an open, pointed end, and an opposite end, means supporting said needle at its said opposite end and having a chamber which communicates with said bore, a glass pH electrode having a small diameter tube of pH-sensitive glass extending from a first end within said chamber through said needle bore and terminating therein with a closed end adjacent said open needle end, having an enlarged, sealed-end other tube supported within said chamber and sealed at its other end to said first end of said sensitive glass tube, having an electrically insulating coating on the exterior surface of said sensitive glass tube except for a section of said surface exposed to the exterior of said needle through said aperture in the wall thereof, having an internal reference electrode member supported within said enlarged tube, having an electrical lead connected to said member and extending out of said enlarged tube and said chamber, and having an electrically conductive substance contained in said enlarged tube and in said sensitive glass tube and bridging between said member and the interior surface of said sensitive glass tube adjacent said exposed surface section thereof, and a reference electrode having a small diameter bridge tube extending from a first end within said chamber through said needle bore parallel to said sentitive glass tube and terminating at said open needle end with a relatively small end opening in register with said open needle end, having an enlarged, sealed-end bridge tube supported within said chamber and sealed at its other end to said first end of said small bridge tube, having an external reference electrode member supported within said enlarged bridge tube, having an electrical lead connected to the last mentioned member and extending out of said enlarged bridge tube and said chamber, and having an electrically conductive substance contained in said enlarged and said small bridge tubes and bridging between said last mentioned member and said end opening of said small bridge tube.

8. A pH electrode assembly comprising a hypodermic needle having an axial bore, a wall aperture, an open, pointed end, and an opposite end, means supporting said needle at its said opposite end and having a closed-end chamber which communicates at its other end with said bore, a glass pH electrode having a small diameter tube of pH-sensitive glass opening into said chamber and extending from a first end therein through said needle bore and terminating therein at a second end adjacent said open needle end, having an electrically insulating coating on the exterior surface of said sensitive glass tube except for a section of said surface exposed to the exterior of said needle through said aperture in the wall thereof, having an internal reference electrode member supported within said chamber, having an electrical lead connected to said member and extending out of said chamber, and having an electrically conductive substance contained in said chamber and in said sensitive glass tube and bridging between said member and the interior surface of said sensitive glass tube adjacent said exposed surface section thereof, and a reference electrode having a small diameter bridge tube extending from a first end within said chamber through the bore of said sensitive glass tube out of said second end thereof and terminating at said open end with a relatively small end opening in register with said open needle end, having an enlarged, sealed-end bridge tube supported within said chamber and sealed at its other end to said first end of said small bridge tube, having an external reference electrode member supported within said enlarged bridge tube, having an electrical lead connected to the last mentioned member and extending out of said enlarged bridge tube and said chamber, and having an electrically conductive substance contained in said enlarged and said small bridge tubes and bridging between said last mentioned member and said end opening of said small bridge tube, said second end of said sensitive glass tube being sealed to the outer surface of said small bridge tube where the latter passes out of said sensitive glass tube.

9. An assembly as specified in claim 8, wherein said first end of said sensitive glass tube within said chamber is sealed to the outer surface of one of said bridge tubes, and wherein said sensitive glass tube is provided with a wall aperture within said chamber.

10. An assembly as specified in claim 8, wherein said first end of said sensitive glass tube opens into said chamber.

References Cited by the Examiner

UNITED STATES PATENTS

| | | | |
|---|---|---|---|
| 2,201,659 | 5/1940 | Young | 204—195 |
| 2,637,316 | 5/1953 | Grez | 128—2.1 |
| 2,755,243 | 7/1956 | Beckman et al. | 204—195 |
| 2,816,997 | 12/1957 | Conrad | 128—2 X |
| 2,840,069 | 6/1958 | Squire | 128—2 |
| 2,886,771 | 5/1959 | Vincent | 128—2 |
| 2,924,213 | 2/1960 | Fleck | 128—2.1 |
| 3,000,805 | 9/1961 | Carritt | 128—2 X |
| 3,049,118 | 8/1962 | Arthur et al. | 128—2 |
| 3,060,923 | 10/1962 | Reiner | 128—2.1 |
| 3,103,480 | 9/1963 | Watanabe et al. | 204—195 |

FOREIGN PATENTS

| | | |
|---|---|---|
| 1,036,539 | 8/1958 | Germany. |
| 1,090,451 | 10/1960 | Germany. |

OTHER REFERENCES

Ellis et al.: "Journal of American Chemistry Soc., vol. 57, 1935, pages 2139–2144.

Landis: "Cereal Chemistry," vol. 11, 1934, pages 313–318.

Lillehei: Publication, page 2008.

Lillehei: "Transistor Pacemaker," page 2007 of JAMA, April 30, 1960.

RICHARD A. GAUDET, *Primary Examiner.*

R. J. HOFFMAN, JORDAN FRANKLIN, SIMON BRODER, *Examiners.*